United States Patent Office 3,330,680
Patented July 11, 1967

3,330,680
NOVEL IMAGE-RECEIVING ELEMENTS
Howard C. Haas, Arlington, Mass., assignor to Polaroid Corporation, Cambridge, Mass., a corporation of Delaware
No Drawing. Filed Oct. 29, 1963, Ser. No. 319,653
3 Claims. (Cl. 117—33.3)

This invention relates to novel polymers, and the process of making the same, and more particularly to novel polymers that absorb ultraviolet light.

One object of this invention is to provide novel ultraviolet light-absorbing condensation polymers.

Another object of this invention is to provide a novel process for protecting color photographic images by means of novel ultraviolet light-absorbing polymers.

Still another object is to provide a novel color photographic image-receiving element which has been protected from injurious ultraviolet light by means of ultraviolet light-absorbing polymers.

Other objects will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference may be had to the following detailed description.

It has been found desirable to protect materials sensitive to ultraviolet light, e.g., photographic color images, with a protective material which will absorb the harmful ultraviolet radiation but which will transmit radiation of other wavelengths. By applying such an ultraviolet-absorbing layer in the form of a polymer, several advantages may be realized, e.g., the application of the layer will be easier, the desired degree of ultraviolet absorption can be readily controlled by the thickness of the polymer or by the concentration of ultraviolet-absorbing groups in the polymer, the ultraviolet absorber will not migrate on the surface but will provide a stable, continuous coating, a glossy coating may be imparted to the image-receiving element, and a protective coat to prevent physical damage may also be applied concurrently.

The novel ultraviolet-absorbing polymers of this invention are condensation polymers containing ultraviolet-absorbing groups.

The condensation type polymers of this invention may be prepared by a phenol-formaldehyde condensation reaction utilizing an ultraviolet light absorber containing an active benzene ring such as a benzophenone type ultraviolet light absorber, e.g., 2,2'-dihydroxy-4-methoxy benzophenone or 2,2',4,4'-tetrahydroxy benzophenone. It should be understood that two or more ultraviolet absorbers may be used to form a polymer as well as a single ultraviolet absorber.

As examples of suitable benzophenone-type compounds suitable for use in the present invention, mention may be made of the following:

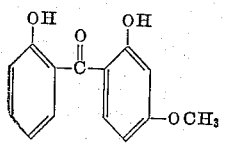

(1) 2,2'-dihydroxy-4-methoxybenzophenone

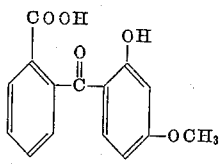

(2) 2-hydroxy-4-methoxy-2'-carboxybenzophenone

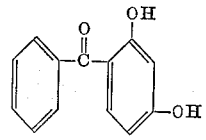

(3) 2,4-dihydroxybenzophenone

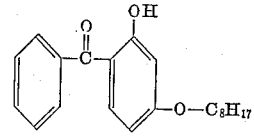

(4) 2-hydroxy-4-n-octoxybenzophenone

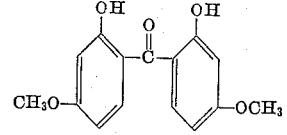

(5) 2,2'-dihydroxy-4,4'-dimethoxybenzophenone

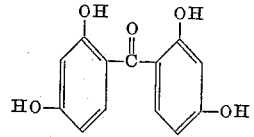

(6) 2,2',4,4'-tetrahydroxybenzophenone

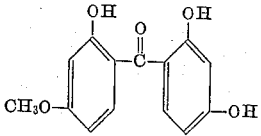

(7) 2,2',4-trihydroxy-4'-methoxybenzophenone

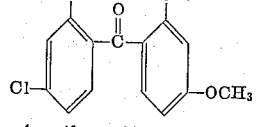

(8) 2-hydroxy-4-methoxy-2',4'-dichlorobenzophenone

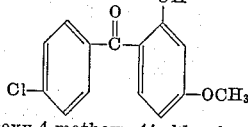

(9) 2-hydroxy-4-methoxy-4'-chlorobenzophenone

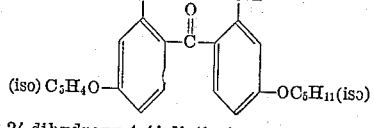

(10) 2,2'-dihydroxy-4,4'-di-(iso)-pentoxybenzophenone

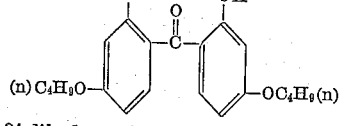

(11) 2,2'-dihydroxy-4,4'-di-(n)-butoxybenzophenone

The following nonlimiting examples illustrate the preparation of condensation-type ultraviolet absorbing polymers within the scope of this invention:

Example 1

10 gm. of 2,2'-dihydroxy-4-methoxy benzophenone was dissolved in 10 ml. of isopropanol at 100° C., to which was added 20 ml. of 37% formaldehyde and 0.2 gm. of oxalic acid. The mixture was heated to 100° C. and stirred in a closed system for 3 hours. The pH was adjusted to 9 with 20% sodium hydroxide, heated to 100° C. and stirred for 2 hours. The solvent was then stripped off under vacuum and the resulting molten mixture was heated at 100° C. at 0.1 mm. of pressure for 3 hours. 10 gm. of the yellow polymer was isolated. The resulting polymer is soluble in alcohol and acetone.

Example 2

A solution of 1.6 gm. of 2,2',4,4'-tetrahydroxy benzophenone in 3 ml. of propyl alcohol, 5 gm. of p-cresol, 5 gm. of 37% formaldehyde and 0.15 gm. of oxalic acid was heated under nitrogen for 3 hours at 100° C. The solvent was stripped off under vacuum and the residue was heated at 100° C. at 0.1 mm. pressure for 30 min. The resulting polymer was extracted with ether and dried.

The copending application of Howard G. Rogers, Ser. No. 786,766, filed Jan. 14, 1959, now abandoned, discloses means for protecting color photographic images from the deleterious effects of sunlight. The invention is primarily concerned with color diffusion transfer processes wherein a photosensitive element including a silver halide emulsion layer is exposed to create therein a latent image. The latent image is developed and, concurrent with and under the control of this development, an imagewise distribution of mobile organic color-providing substances is formed. At least a portion of these color-providing substances is transferred to a superposed image-receiving stratum to form a colored image thereon. As examples of such processes, mention may be made of the processes disclosed and claimed in U.S. Patent No. 2,983,606, issued May 9, 1961, to Howard G. Rogers, U.S. Patent No. 2,647,049, issued July 28, 1953 to Edwin H. Land, and U.S. Patent No. 2,774,668, issued Dec. 18, 1956 to Howard G. Rogers. In one mode of carrying out the invention of the above-designated copending application, Ser. No. 786,766, an ultraviolet light absorber may be incorporated in a layer over the dyeable structure of an image-receiving element and, during processing, a substantial portion of the transferred color-providing substances may be caused to permeate through such layers to the underlying dyeable stratum so as to be protected from the deleterious effects of sunlight by the overlying layer through which they had permeated.

The novel ultraviolet light-absorbing polymers of this invention are suitable for use in the invention of the copending application Ser. No. 786,766. Novel image-receiving elements may be prepared by applying a polymer within the scope of this invention to an image-receiving element. The thickness of the polymer layer may be varied to suit particular needs; however, a thin polymer layer is preferably applied, in order to minimize any loss of density or difficulties in transferring the color-providing substances through the polymer. The amount of ultraviolet light-absorbing polymer utilized necessarily depends upon the stability and susceptibility of the color-providing substances carried by the image-receiving layer to the harmful rays of sunlight.

Image-receiving elements suitable for use within the scope of this invention generally comprise a support which has been coated with an image-receiving stratum of dyeable material, e.g., polyvinylpyridine, a mixture of polyvinylpyridine and gelatin or polyvinyl alcohol, a mixture of polyvinyl alcohol and polyvinyl pyrrolidone, copolymers of vinyl alcohol and vinyl pyrrolidone, and nylons such as N-methoxymethyl polyhexamethylene adipamide. The preferred image-receiving elements comprise polyvinylpyridine, such as those disclosed and claimed in the copending application of Howard C. Haas, Ser. No. 50,848, filed Aug. 22, 1960, now Patent No. 3,148,061.

It has been found that the image-receiving elements which are protected by the ultraviolet light-absorbing polymers of this invention, particularly, the polymer prepared by the condensation of 2,2'-dihydroxy-4-methoxy benzophenone with formaldehyde, may have a yellow tint. It is believed that the yellow tint is due to the presence, in the polymer, of some molecules in the form of the sodium salt. This yellow tint can be readily removed from the print and at the same time improved stability characteristics imparted, by swabbing the print with an acid, preferably boric acid. If desired, the yellow tint may be removed by treating with an acid prior to photographic processing. The copending application of Howard G. Rogers, Ser. No. 93,309, filed Mar. 6, 1961, now Patent No. 3,239,338, discloses and claims the use of boric acid as a protective swab for color photographic images.

The effectiveness of the image-receiving elements of this invention was tested by exposing such elements, after formation thereon of a dye developer transfer image in accordance with the processes described in said U.S. Patent No. 2,983,606, to a bank of sun lamps along with a control comprising an image-receiving element similar in composition to the one on test, but without the protective polymeric layer. After exposure of 72 hours, the transfer images, prepared by using the image-receiving elements of this invention, exhibited substantially less fading than the control images.

The novel polymers of this invention are useful as barrier layers to provide protection against the harmful effects of ultraviolet radiation. The novel polymers of this invention may be used to provide a layer of a nonmigratory ultraviolet absorber on color photographic images as disclosed above or may be incorporated into waxes, polishes, paints and lacquers to provide protection for furniture against harmful effects of sunlight.

Since certain changes may be made in the above product and process without departing from the scope of the invention herein involved, it is intended that all matter contained in the above description shall be interpreted as illustrative and not in a limiting sense.

What is claimed is:

1. An image-receiving element adapted to be used in color diffusion transfer processes, comprising a support bearing in turn a dyeable image-receiving stratum and a layer of an ultraviolet light-absorbing polymer, permeable to color providing substances, said layer comprising the condensation product of a hydroxy benzophenone ultraviolet light absorber and formaldehyde.

2. An image-receiving element as defined in claim 1 wherein said ultraviolet light absorber is 2,2'-dihydroxy-4-methoxy benzophenone.

3. An image-receiving element as defined in claim 1 wherein said ultraviolet light absorber is 2,2',4,4'-tetrahydroxy benzophenone.

References Cited

UNITED STATES PATENTS

| | | | |
|---|---|---|---|
| 2,269,220 | 1/1942 | Nadeau | 96—84 X |
| 2,875,053 | 2/1959 | Minsk | 96—84 |
| 3,050,500 | 8/1962 | Sherwood | 260—45.95 |
| 3,069,262 | 12/1962 | Haas | 96—29 |
| 3,160,665 | 12/1964 | Siegrist et al. | 252—300 X |
| 3,215,530 | 11/1965 | Riebel et al. | 96—84 X |
| 3,249,435 | 5/1966 | Rogers | 96—29 |

NORMAN G. TORCHIN, *Primary Examiner.*

R. H. SMITH, *Assistant Examiner.*